(12) United States Patent
Alkan et al.

(10) Patent No.: US 11,386,265 B2
(45) Date of Patent: Jul. 12, 2022

(54) FACILITATING INFORMATION TECHNOLOGY SOLUTION TEMPLATES

(71) Applicant: International Business Machines Corporation, Armonk, NY (US)

(72) Inventors: Oznur Alkan, Dublin (IR); Rahul Nair, Dublin (IR); Bei Chen, Blanchardstown (IR); Massimiliano Mattetti, Dublin (IR); Elizabeth Daly, Dublin (IR); Alan Zwiren, Lake Worth, FL (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 10 days.

(21) Appl. No.: 17/121,797

(22) Filed: Dec. 15, 2020

(65) Prior Publication Data
US 2022/0188506 A1 Jun. 16, 2022

(51) Int. Cl.
*G06F 40/186* (2020.01)
*G06F 40/20* (2020.01)
(Continued)

(52) U.S. Cl.
CPC ........ *G06F 40/186* (2020.01); *G06F 3/04842* (2013.01); *G06F 16/90332* (2019.01); *G06F 40/20* (2020.01); *G06F 17/18* (2013.01)

(58) Field of Classification Search
CPC .. G06F 40/186; G06F 16/90332; G06F 40/20; G06F 3/04842; G06F 17/18
(Continued)

(56) References Cited

U.S. PATENT DOCUMENTS

| 6,542,912 B2 | 4/2003 | Meltzer et al. |
| 7,366,706 B2 | 4/2008 | Chang et al. |

(Continued)

FOREIGN PATENT DOCUMENTS

| CN | 108090640 A | 5/2018 |
| CN | 110400182 A | 11/2019 |

(Continued)

OTHER PUBLICATIONS

Anonymous; "Selling through Microsoft's commercial marketplace"; Microsoft Partner Community; 2019; 14p.
(Continued)

*Primary Examiner* — William D Titcomb
(74) *Attorney, Agent, or Firm* — Cantor Colburn LLP; Kurt Goudy

(57) ABSTRACT

Aspects of the invention include identifying each solution component of a plurality of solution components described in a text of a solution template of a plurality of solution templates, wherein the solution template includes a first combination of solution components. Identifying each solution component of a plurality of solution component described by an object in the solution template of a plurality of solution templates. Detecting a respective number of instances of each solution component in the solution template and a respective number of instances of each solution component in each other solution template of the plurality of solution templates. Generating analytics for a source company based on the respective number of instances of each solution component in the solution template and the respective number of instances of each solution component in each other solution template of the plurality of solution templates.

20 Claims, 6 Drawing Sheets

(51) Int. Cl.
*G06F 3/04842* (2022.01)
*G06F 16/9032* (2019.01)
*G06F 17/18* (2006.01)

(58) Field of Classification Search
USPC ........................................................ 715/255
See application file for complete search history.

(56) References Cited

U.S. PATENT DOCUMENTS

| | | |
|---|---|---|
| 7,590,508 B1 | 9/2009 | Saghier et al. |
| 7,885,851 B2 | 2/2011 | Hurt et al. |
| 7,890,309 B2 | 2/2011 | Bhaskaran et al. |
| 8,311,886 B2 | 11/2012 | Vijay et al. |
| 8,548,871 B2 | 10/2013 | Walker et al. |
| 8,626,572 B2 | 1/2014 | Colliat et al. |
| 8,645,186 B2 | 2/2014 | Moukas et al. |
| 8,744,902 B2 | 6/2014 | Nguyen et al. |
| 9,104,971 B1 | 8/2015 | Chamness et al. |
| 9,116,731 B2 | 8/2015 | Tung et al. |
| 9,985,847 B2 | 5/2018 | Yung et al. |
| 10,069,907 B2 | 9/2018 | Tung et al. |
| 10,284,415 B1 | 5/2019 | Alabsi |
| 2003/0014373 A1 | 1/2003 | Perge et al. |
| 2004/0210489 A1 | 10/2004 | Jackson et al. |
| 2006/0155596 A1 | 7/2006 | Thier |
| 2006/0212337 A1 | 9/2006 | Vayghan et al. |
| 2006/0259499 A1* | 11/2006 | Moulckers .......... G06F 40/186 715/764 |
| 2006/0271581 A1* | 11/2006 | Sanjar .................. G06F 40/131 707/999.102 |
| 2008/0183530 A1 | 7/2008 | Bagchi et al. |
| 2008/0195447 A1 | 8/2008 | Bouillet et al. |
| 2009/0204459 A1 | 8/2009 | Johnson et al. |
| 2010/0088205 A1 | 4/2010 | Robertson |
| 2011/0246260 A1* | 10/2011 | Gilbert ............... G06Q 30/0203 705/7.32 |
| 2012/0290353 A1 | 11/2012 | Jain et al. |
| 2014/0046954 A1* | 2/2014 | MacLean .............. G06F 21/645 707/736 |
| 2014/0067463 A1* | 3/2014 | Richter ............ G06Q 10/06398 705/7.29 |
| 2014/0122240 A1* | 5/2014 | Olsen ................ G06Q 10/0631 705/14.61 |
| 2014/0236663 A1 | 8/2014 | Smith et al. |
| 2014/0278808 A1 | 9/2014 | Iyoob et al. |
| 2017/0237859 A1 | 8/2017 | Hedges |
| 2018/0005253 A1 | 1/2018 | Megahed et al. |
| 2018/0081868 A1* | 3/2018 | Willcock ............. G06F 40/106 |
| 2018/0204164 A1 | 7/2018 | Murugan |
| 2019/0005570 A1* | 1/2019 | Goodman .......... G06Q 30/0639 |
| 2019/0258983 A1 | 8/2019 | Thomaidou et al. |
| 2020/0097161 A1* | 3/2020 | Gonzalez .............. G06F 3/0486 |
| 2020/0159820 A1* | 5/2020 | Rodriguez ............ G06F 40/103 |
| 2020/0387387 A1* | 12/2020 | Iijima ...................... G06F 8/36 |
| 2022/0050960 A1* | 2/2022 | Sanyasi ................ G06F 21/44 |

FOREIGN PATENT DOCUMENTS

| | | |
|---|---|---|
| WO | 200138976 A1 | 5/2001 |
| WO | 2001090998 A2 | 11/2001 |
| WO | 2007092615 A2 | 8/2007 |
| WO | 2007103646 A2 | 9/2007 |
| WO | 2013192245 A2 | 12/2013 |

OTHER PUBLICATIONS

AWS CloudFormation Templates, [online]; [retrieved on Dec. 23, 2020]; retrieved from the Internethttps://aws.amazon.com/cloudformation/resources/templates/.

Azure Marketplace; "Publishing guide for Azure applications solution template offers" microsoft.com; Apr. 22, 2020; 3p.

Baier et al.; "Sales-force performance analytics and optimization"; IBM J. Res. & Dev. vol. 56 No. 6 Paper 8 Nov./Dec. 2012; 10 p.

Chaudhry; "Understanding Azure Solution Templates"; trendmicro.com; 2016; 8p.

Furuhata et al. "Capacity Allocation with Competitive Retailers"; 8th International Conference on Electronic Commerce; 2006; 7p.

Lam et al. "Retail Sales Force Scheduling Based on Store Traffic Forecasting"; Journal of Retailing, vol. 74(1), pp. 61-88, 1998; 28p.

Lawrence et al.;"Analytics-driven solutions for customer targeting and sales force allocation" IBM Systems Journal, vol. 46, No. 4, 2007; 14p.

List of IBM Patents or Patent Applications Treated as Related; Date Filed: Dec. 24, 2020, 2 pages.

Mattetti et al., "Predictive Capacity Optimizer," U.S. Appl. No. 17/121,812, filed Dec. 15, 2020.

Megahed et al.; "An Optimization Approach to Services Sales Forecasting in A Multi-Staged Sales Pipeline"; 2016 IEEE International Conference on Services Computing; 7 p.

Morwitz, et al. When do purchase intentions predict sales?; International Journal of Forecasting 23 (2007) 347-364; 18 p.

Planet Together, [online]; [retrieved on Dec. 22, 2020]; retrieved from the Internethttps://www.planettogether.com/blog/optimize-capacity-planning-with-predictive-analytics.

Shambour et al.; An effective recommender system by unifying user and item trust information for B2B applications; Journal of Computer and System Sciences; 2015; 17P.

Vanguardr, [online]; [retrieved on Dec. 22, 2020]; retrieved from the Internethttps://www.vanguardsw.com/sales-capacity-planning/.

Carvalho, "Capacity planning for IaaS Cloud Providers Offering Multiple Service Classes", Future Generation Computer Systems 77 91-111; Jul. 6, 2017; 15 pages.

Singh, "Prediction-Based Resource Assignment Svheme to Maximize the Net Profit of Cloud Service Providers"; Scientific Public Research, Communications and Network, May 29, 2020; 74-97p. 24 pages.

Toosi, "Revenue Maximization with Optimal Capacity Control in Infrastructure as a Service Cloud Markets", IEEE Transactions on Cloud Computing, vol. 3 No. 3, Jul.-Sep. 2015; 14 pages.

\* cited by examiner

NLP-powered search index

1. Users upload OCR image for analysis on Co. A storage service.
2. Co. A storage service upload triggers Co. A computing platform.
3. Co. A computing platform invokes machine learning model on Co. B machine learning accelerator to extract text from image.
4. Co. A computing platform sends extracted text to Co. B natural language processing unit for entity and key phrase extraction.
5. The data is indexed and loaded into Co. C database.
6. Co. C receives indexed data.
7. End users access indexed data through Co. C platform.

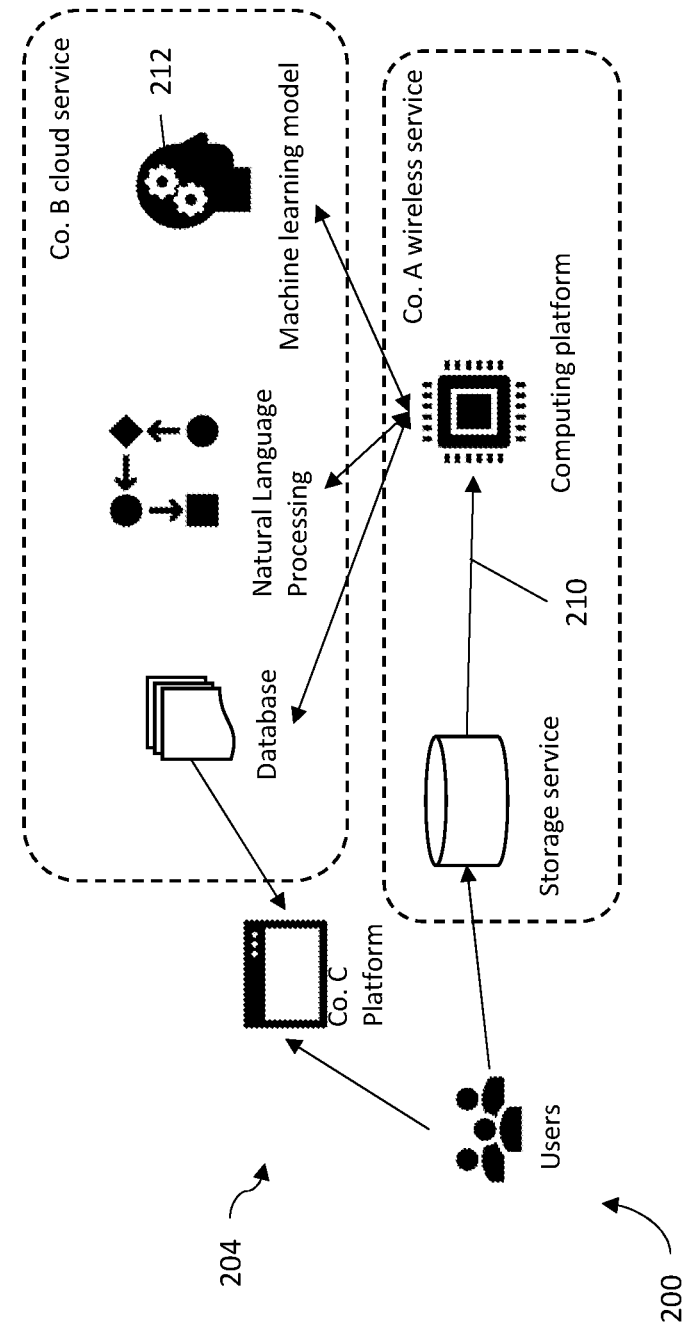

FIG. 2

FACILITATING INFORMATION TECHNOLOGY SOLUTION TEMPLATES

BACKGROUND

The present invention generally relates to programmable computing systems, and more specifically, to programmable computing systems configured to facilitate information technology solution templates.

A resource management system includes a software application that assists commercial enterprises with planning for current and future resource allocation. Resources include data storage space, processing availability, and hardware accessibility. The software application enables users to collaborate, share data, report data, and schedule computing resource allocation. The software application also monitors and analyzes real-time usage of computing resources in view of project deadlines and future allocations of the computing resources. Through the analysis, the software application monitors work project progress and predicts future availability of computing resources.

SUMMARY

Embodiments of the present invention are directed to facilitate information technology solution templates. A non-limiting example computer-implemented method includes identifying each solution component of a plurality of solution components described in a text of a solution template of a plurality of solution templates, wherein the solution template includes a first combination of solution components. Identifying each solution component of a plurality of solution component described by an object in the solution template of a plurality of solution templates. Detecting a respective number of instances of each solution component in the solution template and a respective number of instances of each solution component in each other solution template of the plurality of solution templates. Generating analytics for a source company based on the respective number of instances of each solution component in the solution template and the respective number of instances of each solution component in each other solution template of the plurality of solution templates.

Other embodiments of the present invention implement features of the above-described method in computer systems and computer program products.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

FIG. 2 illustrates an information technology solution template in accordance with one or more embodiments of the present invention;

The diagrams depicted herein are illustrative. There can be many variations to the diagrams or the operations described therein without departing from the spirit of the invention. For instance, the actions can be performed in a differing order, or actions can be added, deleted, or modified. Also, the term "coupled" and variations thereof describes having a communications path between two elements and does not imply a direct connection between the elements with no intervening elements/connections between them. All of these variations are considered a part of the specification.

DETAILED DESCRIPTION

One or more embodiments of the present invention provide computer-implemented methods, computing systems, and computer program products that allow a source company to analyze business partner/solution provider solution templates to determine an allocation of the source company's computing resources.

A source company's information technology (IT) system stores and analyzes customer sales history to improve the company's resource management. Using the sales history, the IT system can determine which of the source company's components are being requested by solution providers/customers, which components are not being requested, and which components are being requested together. The data also enables the source company to allocate computing resources to ensure the capacity to meet solution provider/customer requests. As used herein, a business partner, solution provider, or customer is an entity distinct from the source company. Historically, solution providers have presented solution templates to customers, in which the solutions only use the source company's components. Solution templates are documents that describe the functionality of a solution along with the technical components to achieve the solution. However, as time progresses, more and more solution providers are offering solutions that include components from multiple companies. As customers purchase these new solutions, the source company is only aware of requests for its own components. As a result, the source company cannot accurately predict whether another company's components will impact its own resource capacity.

One or more embodiments of the present invention address one or more of the above-described shortcomings by providing computer-implemented methods, computing systems, and computer program products that extract resource allocation insights by analyzing the text and images found in solution provider solution templates. Solution provider solution templates are analyzed to identify source company solution components and secondary party solution components. The source company components and secondary-party components are analyzed to determine whether any trends found to suggest that the source company should reallocate cloud computing resources to meet future demands.

Figure 1:
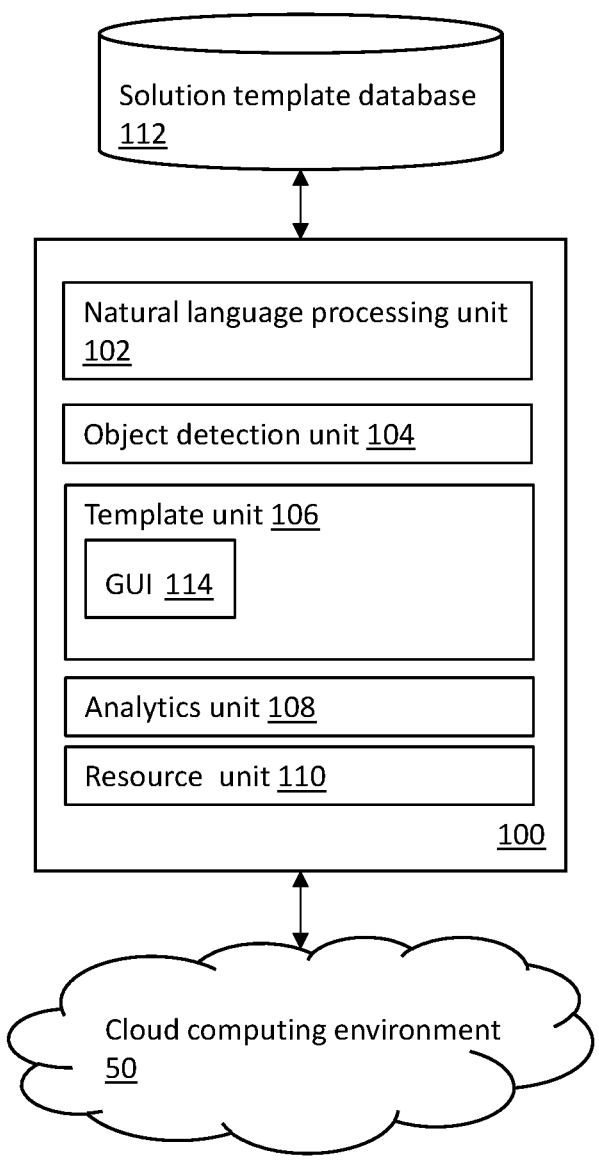
FIG. 1 illustrates a block diagram of components of a system for facilitating information technology solution templates in accordance with one or more embodiments of the present invention.

Turning now to FIG. 1, a system 100 for facilitating information technology solution templates is generally shown in accordance with one or more embodiments of the present invention. The system 100 includes a natural language processing unit (NLP) 102 for parsing the text of technical documents and solution templates to identify text and derive a meaning from the text. The system 100 further includes an object detection unit 104 to detect and classify objects found in the technical documents and solution templates. The system 100 includes a template unit 106 for generating an editable solution template and providing user search tools. The system 100 further includes an analytics unit 108 for analyzing the determinations of the NLP unit 102 and the object detection unit 104 to predict computing resource consumption. The system 100 further includes a resource unit 110 for reallocation of computer-based resources to enable the source company's computing resource capacity to meet future demand. The system 100 is in operable communication with a solution template database 112 for storing and searching for solution templates. The system 100 is further in operable communication with the source company's cloud computing environment. 50

The NLP unit 102 is operable to receive one or more technical document(s) from a solution provider and derive a semantic meaning of the technical document(s). Technical documents are any document that includes the steps, functionality, components, and architecture of a solution. The technical documents contain extraneous information not found in solution templates, and can include solution steps in a narrative format, rather than a bullet point format found in solution templates. The NLP unit 102 applies natural language processing techniques, via a model, to semantically analyze the technical document(s). The model can be, for example, a word embedding model. The NLP unit 102 receives the technical document(s) detects the text, and segments the text into passages (e.g., paragraphs, sections, etc.). For example, the NLP unit 102 identifies text and divides technical document text into individual steps by detecting a number of each solution step (e.g., step 1, step 2, . . . ). The NLP unit 102 further segments the passages (e.g., method steps) into tokens (e.g., words and phrases). The NLP unit 102 retrieves individual passages and map the tokens in the passage to respective word vectors. Various techniques can be applied to derive a context of the technical document(s). For example, the NLP unit 102 can take a target word being learned and attempt to predict the surrounding context words from it. In another embodiment of the present invention, the NLP unit 102 analyzes the context of the words surrounding a masked target word and seeks to predict the target word based on the surrounding words. Upon learning a context of the text, the NLP unit 102 identifies the text segments that describe the solution steps. The NLP unit 102 can be implemented through a neural network type architecture with input, hidden, and output layers. The NLP unit 102 is trained to use the content to identify the passages that describe the steps of a solution from the technical document(s). The NLP unit 102 can be trained to semantically analyze text based on different technology fields (e.g., communication-based solutions, hardware-based solutions, and cloud computing-based solutions).

In some embodiments of the present invention, the NLP unit 102 can apply machine learning techniques to perform the semantic analysis. In an exemplary embodiment, the NLP unit 102 employs a trained artificial neural network, for example, a recurrent neural network (RNN), or other neural network appropriate for text analysis.

The object detection unit 104 is also operable to receive the technical document(s) from the solution provider and employ a model to identify any objects in the technical document(s). The technical document(s) generally includes images used to illustrate solution steps (e.g., a directed graph), illustrate corporate logos, and illustrate computing components. The technical document(s) generally also includes a flow diagram composed of images to visually describe the solution. The object detection unit 104 can employ a model that executes computer vision techniques on the technical document(s) for object detection. Object detection includes both image classification and object localization. Image classification includes predicting a class of one or more objects in the technical document(s). To perform image classification, the object detection unit 104 receives the technical document(s) as an input and outputs a class label for each object in the form of one or more integer values mapped to class values. Object localization includes identifying a location of the one or more identified objects in the technical document(s). In addition to identifying the location of image objects, the object detection unit 104 can further determine the location of text and the object's distance from the text. To perform object localization, the object detection unit 104 can process the received technical document(s) and output one or more bounding boxes, which define a spatial relationship of the objects in the solution template. The object detection unit 104 can be implemented through a neural network type architecture with input, hidden, and output layers. The object detection unit 104 can be trained to detect objects, for example, arrows that are indicative of a flow diagram, or logos signifying particular source companies. Upon identifying the objects in the technical document(s), the object detection unit 104 detects the objects related to visually describing the solution steps.

An exemplary embodiment, the object detection unit 104 employs a trained artificial neural network to execute the model, for example, a region-based convolutional neural network (R-CNN), or other neural network appropriate for image analysis. The R-CNN generally operates in three phases. First, the R-CNN analyzes the technical document(s), extracts independent regions in the technical document(s), and delineates the regions as candidate bounding boxes. Second, the R-CNN extracts features, for example, using a deep convolutional neural network, from each region. Third, a classifier, for example, a support vector machine (SVM), is used to analyze the features and predict a class for one or more objects in a region.

The template unit 106 is operable to receive the analysis from the NLP unit 102 and the object detection unit 104 and generate one or more editable solution templates. The editable solution templates are arranged in predetermined formats. For example, one predetermined format includes textual solution steps on the left half of a solution template, and a visual workflow (e.g., directed graph, table) on the right side of a solution template. In another embodiment, the predetermined format includes textual solution steps on the bottom half of a solution template and the visual workflow on the top half of a solution template. The editable solution templates include solution steps extracted from the text of the technical documents and objects identified in images. In the instance that the technical documents failed to include a visual workflow, the template unit 106 inserts each textual step into a node of a directed graph, cell of a table, or other appropriate visual object. In some embodiments of the present invention, the editable solution templates are generated in editable computing format, such HTML, XML, TXT, SRT, or other appropriate editable format. The editable format can include a markup computing language. The editable solution template can be retrieved by the solution provider that provided the technical document(s). The solution provider can edit the editable solution template. In some embodiments of the present invention, the template unit 106 includes a graphical user interface (GUI) 114 that provides editing tools for the solution provider. Once the solution provider approves the solution template, the solution provider can use the GUI 114 to convert the solution template into a non-editable format, such as a pdf, and publish the solution template in the solution template database 112.

The GUI 114 is also operable to allow customers to search the solution template database 112. The GUI 114 includes Boolean or natural language search operability. A user can access solution templates using keywords or describing an issue. In some embodiments of the present invention, The GUI 114 allows users to perform queries based on components (e.g., data, storage, functionality, customer insights, claims management, etc.). The GUI 114 also allows a user to rank or rate solution templates for the ranking score. For example, the GUI 114 includes a rating functionality that permits a user to rate a solution template on a scale. The GUI 114 can further allow a user to indicate which solution templates were chosen by the user to solve the user's issue. The GUI 114 displays solution templates that match the keywords. The solution templates can be ordered to reflects a keyword matching score (e.g., term frequency-inverse document frequency (TF-IDF) score) as well as ranking score. In exchange for a solution provider uploading solution templates to the source company's solution template database 112, the template unit 106 adjusts the search results to highlight the rankings and the number of times selected. For example, the template unit 106 lists the highest ranked solution templates first in response to a search or query. Additionally, the template unit 106 causes the solution template rating to be shown along with the search results on the GUI 114. Furthermore, the template unit 106 causes the search results to list the solution templates in order of the number of times selected.

It should be appreciated in certain instances, a solution provider can either provide an edited solution template or a solution template without ever having received an editable solution template. In such instances, the NLP unit 102 and the object detection unit 104 can convert the completed solution template into a machine readable format, such as a pdf, and re-analyze the text and images in the solution template.

The analytics unit 108 is operable to receive the textual content and image determinations from the NLP unit 102 and the object detection unit 104. The analytics unit 108 analyzes the identified solution components and extrapolate analytics from the data. For example, the analytics unit 108 can determine which company's components are being incorporated into the solutions. The analytics unit 108 further identifies each company associated with a solution component and tabulates the numbers of instances of each company and component.

The analytics unit 108 analyzes the solution components described in the solution templates and determines which components to recommend to customers. The analytics unit 108 detects a rating of a solution template. Rating includes any descriptive value associated with a template. For example, a one for a poor solution template, a five for an excellent solution template, and a number from two to four for templates considered between poor and excellent. Based on the rating scores, the analytics unit 108 ranks each solution template. The analytics unit 108 associates each solution component with the solution template's score. The analytics unit 108 calculates mean, median, and range values of scores for each solution component. The analytics unit 108 can cause the GUI 114 to display the solution components along with their mean, median, and range values. Based on the mean, median, and range, the analytics unit 108 can further generate recommendations for components. For example, if a solution provider's solution template includes the solution component from company ABC, but the same solution component from company XYZ has a higher mean and/or median value than the analytics unit 108 can transmit an electronic message to the solution provider that company XYZ's solution component has a higher mean and/or mean value.

The analytics unit 108 further predicts future use and sales of solution components. The analytics unit 108 receives descriptions the solution components from the NLP unit 102 and the object detection unit 104. The descriptions include the identity of the solution component as well as the company associated with the component. The analytics unit 108 forecasts future sales and uses based on trends derived from the instances of solution component and company. For example, the analytics unit 108 monitors each time a solution component is included in a solution template uploaded to the solution template database 112. The analytics unit 108 can detect the number of instances of a solution component or solution component/company combination at the beginning of a time interval and the end of the time interval. The analytics unit 108 subtracts the number of instances and the end of the time interval from the number of instances at the beginning of the time interval. The analytics unit 108 then divides the figure derived from the subtraction from the number of instances at the beginning of the time interval to determine the trending value. For example, the analytics unit 108 determines a trending value for solution component 123 from the time interval of Jan. 1, 2019 to Dec. 31, 2019.

The analytics unit 108 further makes recommendations based on a comparison between the trending value and a threshold trending value. For example, if a solution provider's solution templates include the solution component from company ABC, but the same solution component from company XYZ has a trending value greater than the threshold trending value, then the analytics unit 108 can transmit an electronic message to the solution provider that company XYZ's solution component has a higher mean and/or mean value. If, however, the trending value is not greater than the threshold trending value, then the analytics unit 108 does not transmit the message.

The analytics unit 108 further generates customer profiles to identify additional needs. In each instance that a customer provides information that they chose a particular solution template, the analytics unit 108 tabulates a count of the solution provider that generated the solution template, each solution component in the solution template, and each company associated with the solution component. The analytics unit 108 further associates the information with the customer.

The analytics unit 108 further uses the analytics unit 108 to cause the template unit 106 to generate new solution templates distinct from the solution templates edited by the solution providers. The new solution templates replace solution components with solution components based on the ranking and the trends. For example, assume a solution template includes solution components AA, BB, and CC.

Furthermore, based on the analytics unit's analysis, the solution component DD has a higher median score than component CC, and solution component EE has a higher mean score than solution component CC. The template unit 106 generates a first new solution template that replaces solution component CC with solution component DD. The template unit 106 also generates a second new solution template that replaces solution component CC with solution component EE. The template unit 106 can further imports images associated with the solution components DD and EE to replace images associated with solution component CC in the visual workflow portions of the solution templates.

In some embodiments of the present invention, the analytics unit 108 describes the solution components in a Markov chain. Each node of the Markov chain describes a solution component and the number of instances of the component in the solution template database 112. Each edge of the Markov chain describes a probability that given that a solution includes a component signified by a first node, the solution also includes a component described by each connected node. For example, analyzing each of the solution templates, the analytics unit 108 determines that component "A" is listed eight times. Therefore the analytics unit 108 creates node "A" and associates the value of the number of instances, which in this case is eight. The analytics unit 108 also detects that component "B" appears four times in the solution templates with component "A", and component "C" appears twice in the solution templates with component "A". Therefore, the analytics unit 108 creates nodes "B" and "C" and connects them to node "A". Node "B" has an instance value of four, and node "C" has an instance value of two. The edge connecting node "A" to node "B" is associated with a fifty percent probability (4 instances of "B"/8 instances of "A"). The edge connecting node "A" to node "C" is associated with a twenty-five percent probability (2 instances of "C"/8 instances of "A"). As time progresses and solution templates are added or removed from the solution template database 112, these instance values and probabilities increase or decrease. The analytics unit 108 can calculate trends over a period of time, based on the changes in instance values and/or the changes in probabilities. For example, the analytics unit 108 detects that a probability that solution templates for providing 5G services including outdoor small cells component increased by forty-five percent over past six months based on change instance values and changing probabilities.

The analytics unit 108 is further operable to use rules to predict which computing resources of a source company will be consumed based on the solution components found in solution provider solution templates. In some embodiments of the present invention, the analytics unit 108 bases its decision on the connected nodes of the Markov chain. It can be assumed that not every solution provider solution template will not result in a customer purchasing the solution from the solution provider. Therefore, the analytics unit 108 can base its decision based on the number of instances and the probabilities connecting a component node associated with a secondary-company to the component node associated with the source company. For example, assume that node "A" is associated with company 1 and connected node "B" is associated with the source company. Node "A" can also be connected to node "C" which is associated with company 2. The analytics unit 108 can monitor the Markov chain until node "A" has an instance value greater than a threshold instance value. If Node "A" has an instance value greater than the threshold instance value, the analytics unit 108 looks to the probability associated with the edge connecting Node "A" and Node "B". If Node "A" does not have an instance value greater than the threshold instance value, the analytics unit 108 does not look to the probability associated with the edge connecting Node "A" and Node "B". If the probability associated with the edge connected Node "A" and Node "B" is greater than a threshold probability, the analytics unit 108 contacts the resource unit 110 to allocate the source company's cloud computing resources to anticipate future demand. If the probability associated with the edge connected Node "A" and Node "B" is not greater than a threshold probability, the analytics unit 108 does not contact the resource unit 110.

The analytics unit 108 can further look at trends based on the instance value and the probability. The analytics unit 108 can monitor the Markov chain to see if the instance value of node "A" increases greater than a threshold value over a predetermined time interval. If Node "A"s instance value has increased greater than the threshold value, the analytics unit 108 looks to the probability associated with the edge connecting Node "A" and Node "B". If Node "A"s instance value has not increased greater than the threshold value, the analytics unit 108 does not look to the probability associated with the edge connecting Node "A" and Node "B". If the probability associated with the edge connecting Node "A" and Node "B" has increased greater than a threshold probability, the analytics unit 108 contacts the resource unit 110 to allocate the source company's cloud computing resources to anticipate future demand. If the probability associated with the edge connecting Node "A' and Node "B" has not increased greater than a threshold probability, the analytics unit 108 does not contact the resource unit 110. If the probability associated with the edge connecting Node "A" and Node "B" has decreased, the analytics unit 108 contacts the resource unit 110 to indicate that resources can be diverted from servicing component "B".

The analytics unit 108 further predicts a timing of the consumption of the source company's cloud computing resources. The analytics unit 108 bases the prediction based on historical data of the average time between uploading of solution templates into the solution template database 112 and requesting the resources for the source company's component. The analytics unit 108 predicts the timing after the instance value of a source company's component node associated exceeds a threshold value, or when the instance value of a connected node associated with another company exceeds a threshold value and a probability associated with an edge connecting the two nodes exceeds a threshold value. The analytics unit 108 analyzes historical data to determine an average time interval between each solution template being uploaded and a request for resources to support a component. The analytics unit 108 then adds the time interval to a date that each of the present solution templates was uploaded to calculate the future resource request dates. The analytics unit 108 then calculates a Gaussian distribution of the future resource request dates and selects a most likely time interval for the present solution templates. For example, the Gaussian distribution is between three and twelve months. The analytics unit 108 selects a highest probability range, for example, eighty to one hundred percent. The analytics unit 108 then chooses the future request dates within that probability range.

For example, the Markov chain shows the node "A" associated with company 1 has an instance value of one hundred, which is greater than the threshold value. The Markov chain further shows node "A" is connected to Node "C" associated with the source company. The edge connecting node "A" and node "C" is associated with a probability of seventy five percent, which is greater than the threshold value. Based on the historical data, the average time being component "C" being included in a solution template and a request for resources for component "C" is ten months. The analytics unit 108 adds ten months to the upload date of each solution template that includes component "C" to determine the future resource request date. For illustrative purposes is node "C" has an instance value of seventy-five. The analytics unit 108 then takes the resource request data of each of the seventy-five solution templates with component "C" and calculates a Gaussian distribution. From the Gaussian distribution, the analytics unit 108 determines the most likely time interval that the resources for component "C" will be requested.

The resource unit 110 allocates resources of a cloud computing environment 50 based on the determinations of the analytics unit 108. Allocation of cloud computing resources includes enabling the capacity to provide virtual machines, hardware resources including CPU units, and other cloud computing resources. Resource allocation is helpful towards avoiding more than one application competing over a same resource, shortages of resources, over-provisioning of resources, under-provisioning of resources. The resource unit 110 is operable to manage cloud computing resources (e.g., CPU's, memory, and hardware) in the present to be in a position to fulfill predicted demands. Cloud computing resources vary based upon an underlying application consuming the resources. For example, websites require large memory space and bandwidth, scientific and mathematical application require complex computational capacity, financial services requires almost instant availability and security features, and electronic commerce instant accessibility, large memory space, and security features. The resource unit 110 does not necessarily have to begin managing could computing resources in the present to fulfill an exact future demand, rather the resource unit 110 begins managing resources in the present, and up to the predicted resource request dates to have excess capacity of the resources.

The resource unit 110 manages the source company's cloud computing resources based in part on the analytics unit's forecasted request for resources. In other words, the resource unit 110 manages source companies cloud computing resources to have the capability to satisfy an increase in requests for resources. As an example, the analytics unit 108 predicts future requests for virtual machines from a source company's data centers. The resource unit 110 identifies multiple data centers operated by the source company. The resource unit 110 manages a workload of the data centers, such the data centers can fulfill a future demand for delivery virtual machines. This can be accomplished by transferring workload from the data center to other data centers prior to the most likely resource request dates. This can also be accomplished by causing requests to be re-routed to other data centers prior to the resource request dates. The resource unit 110 can manage the source company's cloud computing resources from a present time (e.g., a time that the analytics unit 108 generates a forecast), to an expected date that the resources are requested (e.g., a request date of the request dates within the calculated probability range).

As used herein, "machine learning" broadly describes a function of electronic systems that learn from data. A machine learning system, engine, or module can include a machine learning algorithm that can be trained, such as in an external cloud environment (e.g., the cloud computing environment 50), to learn functional relationships between inputs and outputs that are currently unknown. In one or more embodiments, machine learning functionality can be implemented using an artificial neural network (ANN), having the capability to be trained to perform a currently unknown function. In machine learning and cognitive science, ANNs are a family of statistical learning models inspired by the biological neural networks of animals, and in particular, the brain. ANNs can be used to estimate or approximate systems and functions that depend on a large number of inputs.

ANNs can be embodied as so-called "neuromorphic" systems of interconnected processor elements that act as simulated "neurons" and exchange "messages" between each other in the form of electronic signals. Similar to the so-called "plasticity" of synaptic neurotransmitter connections that carry messages between biological neurons, the connections in ANNs that carry electronic messages between simulated neurons are provided with numeric weights that correspond to the strength or weakness of a given connection. The weights can be adjusted and tuned based on experience, making ANNs adaptive to inputs and capable of learning. For example, an ANN for handwriting recognition is defined by a set of input neurons that can be activated by the pixels of an input image. After being weighted and transformed by a function determined by the network's designer, the activation of these input neurons is then passed to other downstream neurons, which are often referred to as "hidden" neurons. This process is repeated until an output neuron is activated. The activated output neuron determines which character was read.

Referring to FIG. 2, an exemplary solution template 200 is shown. The solution template 200 includes a text portion 202 and an image portion 204. As shown, the text portion 202 includes a description of the solution offered 206, which in this case is "NLP-powered search index". The solution template 200 also offers a seven part solution 208 in text format. As seen, the seven part solution 208 includes components from company A, company B, and company C. The image portion 204 describes the solution visually with text describing the images. As seen, the image portion 204 includes images attributed to company A, company B, and company C. The image portion 204 further includes arrows 210 describing the relationship between different components of the solutions. The image portion 204 further includes logo 212 for company "B". This solution template 200 can be an exemplary editable solution template generated by the template unit 106. This solution template 200 can also be a final solution template that is uploaded to the solution template database 112.

Figure 3:
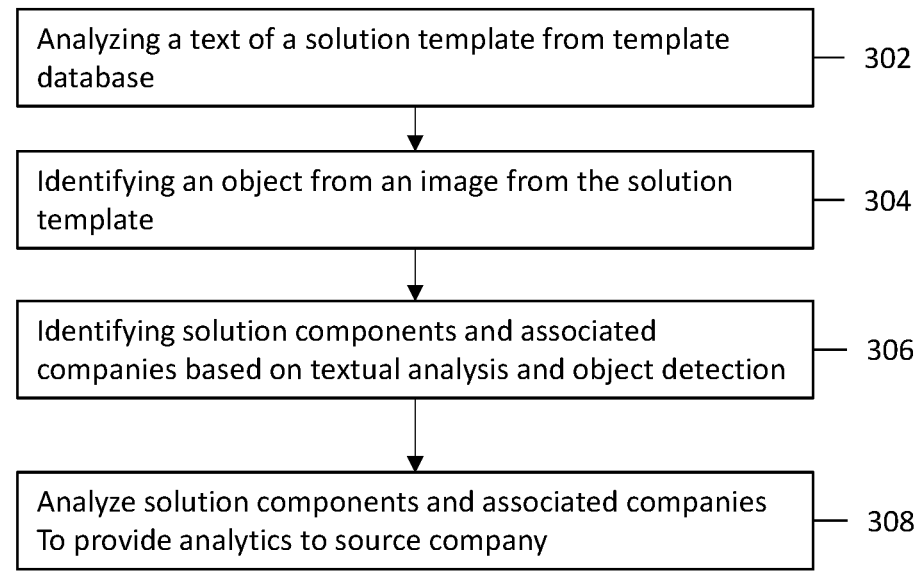
FIG. 3 illustrates a flow diagram of a process for facilitating information technology solution templates in accordance with one or more embodiments of the present invention.

Referring to FIG. 3, illustrates a flow diagram of a process for facilitating information technology solution templates in accordance with one or more embodiments of the present invention. It should be appreciated that all or a portion of the processing shown in FIG. 3 can be performed by a computer system, such as system 100 of FIG. 1. At block 302, an NLP unit 102 analyzes a text of each solution template in a solution template database 112. The NLP unit 102 applies natural language processing techniques, via a word embedding model to determine the context of the text and identify the solution steps. The NLP unit 102 receives the solution template, detects the text, and segments the text into passages (e.g., paragraphs, sections, etc.). For example, the NLP unit 102 divides the solution template into individual steps by detecting a number of each solution step (e.g., step 1, step 2 . . . ). The NLP unit 102 further segments the passages (e.g., method steps) into tokens (e.g., words and phrases). The NLP further employs a word embedding model to determine a context of each of the passages and tokens. The NLP unit 102 identifies individual solution steps based on the context of the passages and tokens.

At block 304, an object detection unit 104 extracts object images from each solution template in the solution template database 112. The object detection unit 104 can employ a model that executes computer vision techniques on the solution template for object detection to derive visual representations of the solution components and workflow. Object detection includes both image classification and object localization. Image classification includes predicting a class of one or more objects in the solution template. To perform image classification, the object detection unit 104 receives the solution template as an input and outputs a class label for each object in the form of one or more integer values mapped to class values. Object localization includes identifying a location of the one or more identified objects in the solution template. In addition to identifying the location of image objects, the object detection unit 104 can further determine the location of text and the object's distance from the text to assist determining a context of a text segment or identifying an object. The closer an object is to text, the more likely the text describes the object.

At block 306, an analytics unit 108 identifies solution components using the text analysis of the NLP unit 102 and the object detection unit 104. The analytics unit 108 can further compare names of solution components to a table of solution components, the table of solution components can include descriptions of the identified solution components as well synonymous terms for the solution components. The analytics unit 108 identifies a first combination of solution components included in the solutions template.

At block 308, the analytics unit 108 analyzes the solution components and associated companies to provide analytics for the source company. The analytics can be based on comparisons of the instances of solution components in a first solution template and the number of instances of each solution component in each other solution template stored in the solution template database. The analytics can include, but not be limited to determining products or solutions to recommend to other customers, predicting future use of sales products, building package or bundles of solutions to be sold, and profiling and understanding customers to identify additional needs or readiness. The result can include a second combination of solution components from the first combination of solution components.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization (e.g., source company). It may be managed by the organization or a third-party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third-party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
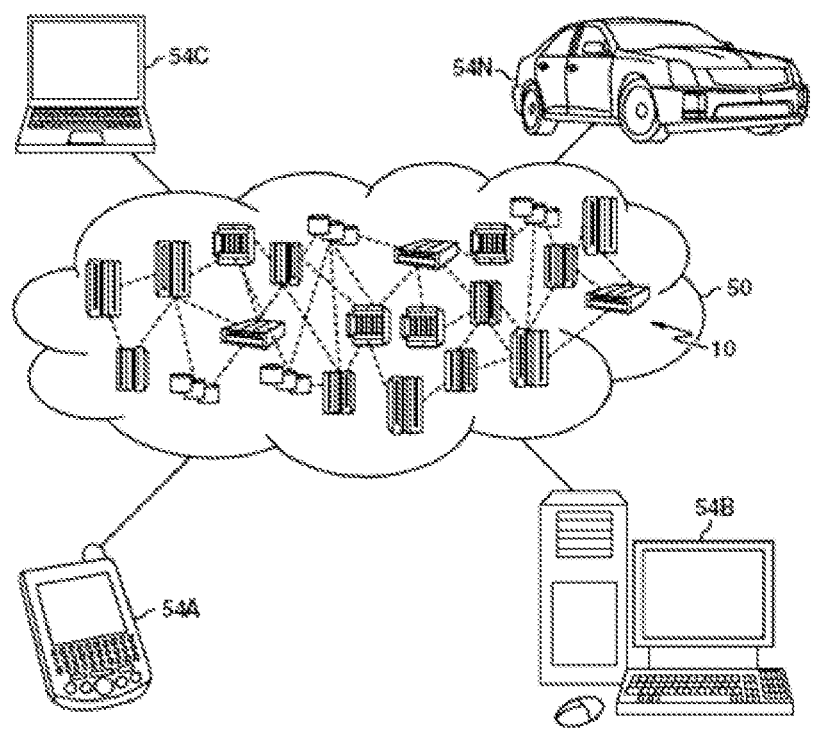
FIG. 4 illustrates a cloud computing environment according to one or more embodiments of the present invention.

Referring now to FIG. 4, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 5:
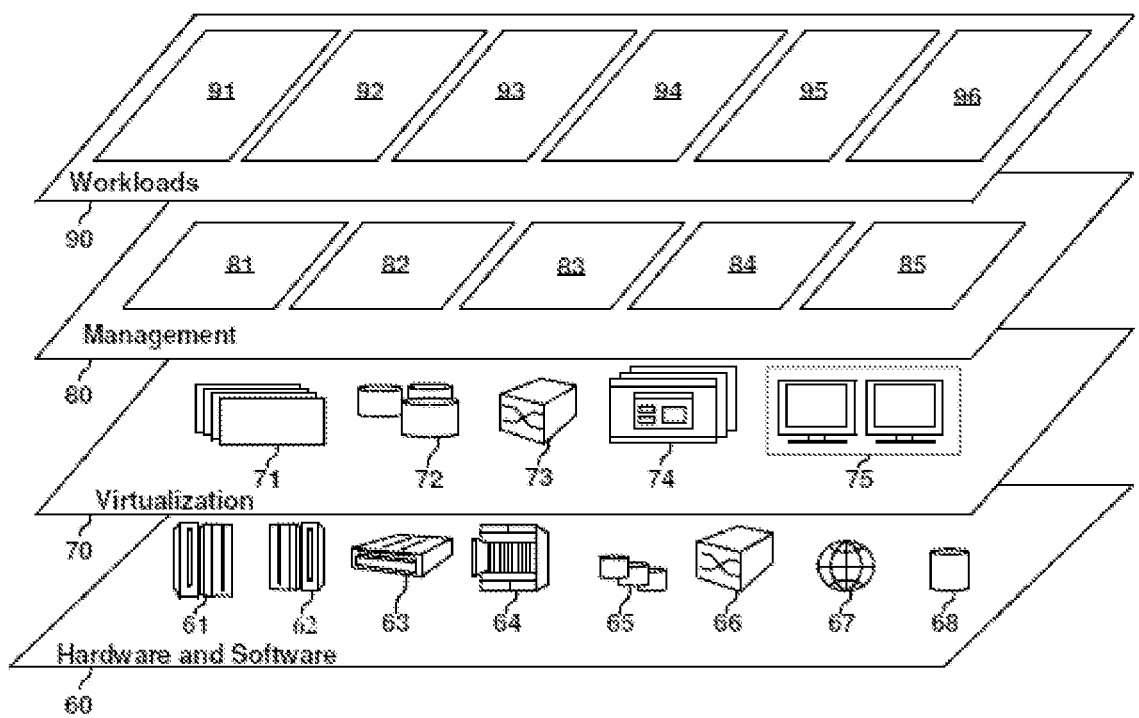
FIG. 5 illustrates abstraction model layers according to one or more embodiments of the present invention.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtualization 93; data analytics processing 94; transaction processing 95; and facilitating information technology solution templates 96.

Figure 6:
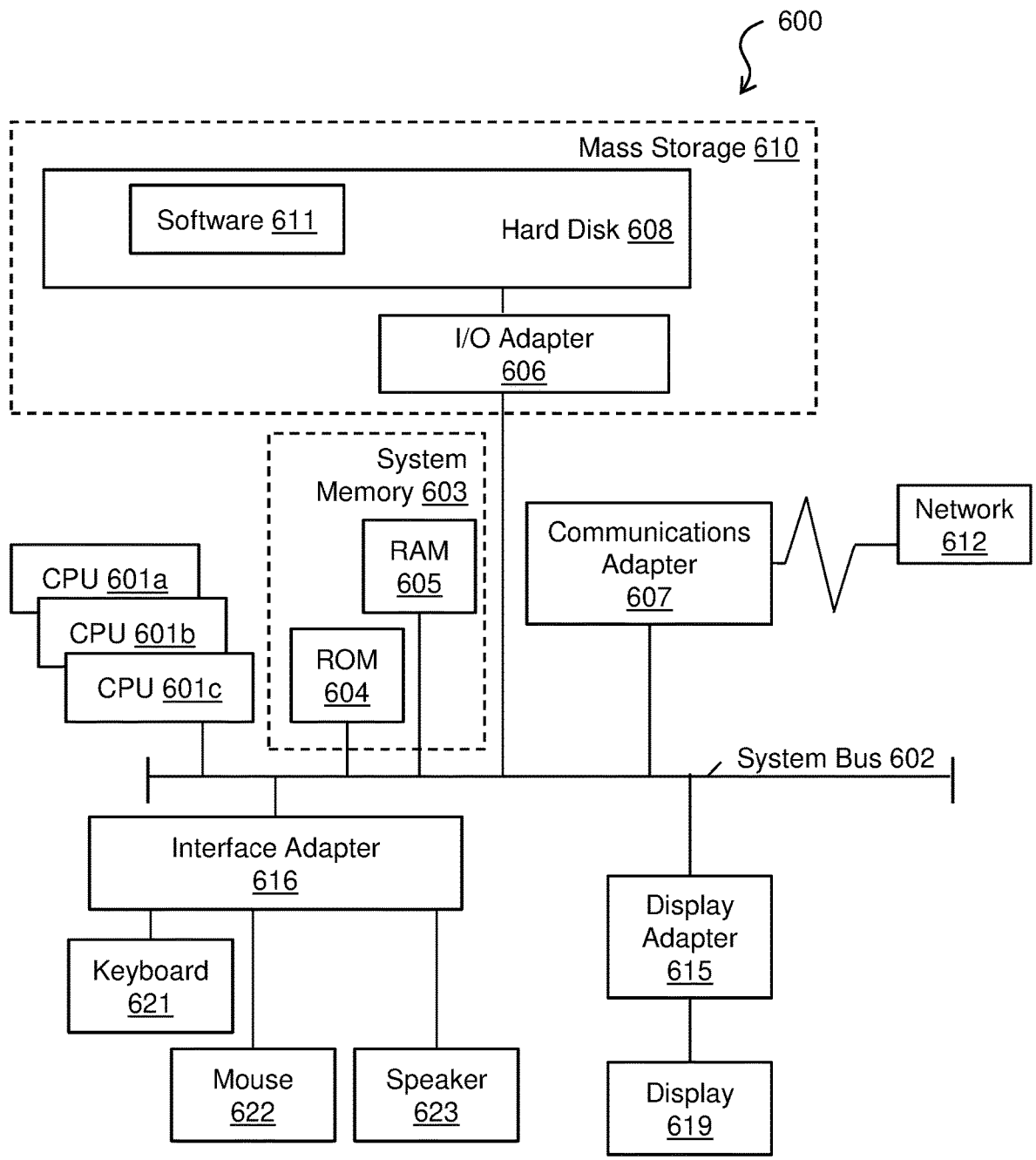
FIG. 6 illustrates a block diagram of a computer system for use in implementing one or more embodiments of the present invention.

In one or more embodiments of the present invention, the hardware/software modules in the system 100 from FIG. 1 can be implemented on the processing system 600 found in FIG. 6. Turning now to FIG. 6, a computer system 600 is generally shown in accordance with an embodiment. The computer system 600 can be an electronic, computer framework comprising and/or employing any number and combination of computing devices and networks utilizing various communication technologies, as described herein. The computer system 600 can be easily scalable, extensible, and modular, with the ability to change to different services or reconfigure some features independently of others. The computer system 600 may be, for example, a server, desktop computer, laptop computer, tablet computer, or smartphone. In some examples, computer system 600 may be a cloud computing node. Computer system 600 may be described in the general context of computer system executable instructions, such as program modules, being executed by a computer system. Generally, program modules may include routines, programs, objects, components, logic, data structures, and so on that perform particular tasks or implement particular abstract data types. Computer system 600 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6, the computer system 600 has one or more central processing units (CPU(s)) 601a, 601b, 601c, etc. (collectively or generically referred to as processor(s) 601). The processors 601 can be a single-core processor, multi-core processor, computing cluster, or any number of other configurations. The processors 601, also referred to as processing circuits, are coupled via a system bus 602 to a system memory 603 and various other components. The system memory 603 can include a read only memory (ROM) 604 and a random access memory (RAM) 605. The ROM 604 is coupled to the system bus 602 and may include a basic input/output system (BIOS), which controls certain basic functions of the computer system 600. The RAM is read-write memory coupled to the system bus 602 for use by the processors 601. The system memory 603 provides temporary memory space for operations of said instructions during operation. The system memory 603 can include random access memory (RAM), read only memory, flash memory, or any other suitable memory systems.

The computer system 600 comprises an input/output (I/O) adapter 606 and a communications adapter 607 coupled to the system bus 602. The I/O adapter 606 may be a small computer system interface (SCSI) adapter that communicates with a hard disk 608 and/or any other similar component. The I/O adapter 606 and the hard disk 608 are collectively referred to herein as a mass storage 610.

Software 611 for execution on the computer system 600 may be stored in the mass storage 610. The mass storage 610 is an example of a tangible storage medium readable by the processors 601, where the software 611 is stored as instructions for execution by the processors 601 to cause the computer system 600 to operate, such as is described herein below with respect to the various Figures. Examples of computer program product and the execution of such instruction is discussed herein in more detail. The communications adapter 607 interconnects the system bus 602 with a network 612, which may be an outside network, enabling the computer system 600 to communicate with other such systems. In one embodiment, a portion of the system memory 603 and the mass storage 610 collectively store an operating system, which may be any appropriate operating system, such as the z/OS or AIX operating system from IBM Corporation, to coordinate the functions of the various components shown in FIG. 5.

Additional input/output devices are shown as connected to the system bus 602 via a display adapter 615 and an interface adapter 616 and. In one embodiment, the adapters 606, 607, 615, and 616 may be connected to one or more I/O buses that are connected to the system bus 602 via an intermediate bus bridge (not shown). A display 619 (e.g., a screen or a display monitor) is connected to the system bus 602 by a display adapter 615, which may include a graphics controller to improve the performance of graphics intensive applications and a video controller. A keyboard 621, a mouse 622, a speaker 623, etc. can be interconnected to the system bus 602 via the interface adapter 616, which may include, for example, a Super I/O chip integrating multiple device adapters into a single integrated circuit. Suitable I/O buses for connecting peripheral devices such as hard disk controllers, network adapters, and graphics adapters typically include common protocols, such as the Peripheral Component Interconnect (PCI). Thus, as configured in FIG. 6, the computer system 600 includes processing capability in the form of the processors 601, and, storage capability including the system memory 603 and the mass storage 610, input means such as the keyboard 621 and the mouse 622, and output capability including the speaker 623 and the display 619.

In some embodiments, the communications adapter 607 can transmit data using any suitable interface or protocol, such as the internet small computer system interface, among others. The network 612 may be a cellular network, a radio network, a wide area network (WAN), a local area network (LAN), or the Internet, among others. An external computing device may connect to the computer system 600 through the network 612. In some examples, an external computing device may be an external webserver or a cloud computing node.

It is to be understood that the block diagram of FIG. 6 is not intended to indicate that the computer system 600 is to include all of the components shown in FIG. 6. Rather, the computer system 600 can include any appropriate fewer or additional components not illustrated in FIG. 6 (e.g., additional memory components, embedded controllers, modules, additional network interfaces, etc.). Further, the embodiments described herein with respect to computer system 600 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
    identifying, by a processor, each solution component of a plurality of solution components described in a text of a solution template of a plurality of solution templates, the plurality of solution components being associated with one or more entities, wherein the solution template includes a first combination of solution components;
    identifying, by a processor, each solution component of a plurality of solution component described by an object in the solution template of a plurality of solution templates;
    detecting, by the processor, a respective number of instances of each solution component in the solution template and a respective number of instances of each solution component in each other solution template of the plurality of solution templates; and
    generating, by the processor, analytics for a source company based on the respective number of instances of each solution component in the solution template and the respective number of instances of each solution component in each other solution template of the plurality of solution templates, the analytics being utilized to allocate computing resources of the source company to the one or more entities in advance of the computing resources being required by the one or more entities.

2. The computer-implemented method of claim 1, wherein the analytics forecast a second combination of solution components that is different than the first combination of solution components.

3. The computer-implemented method of claim 1 further comprising:
    extracting, using natural language processing techniques, text describing solution steps from data;
    generating an editable solution template that includes a description of the solution steps in text;
    transmitting the editable solution template to a solution provider; and
    receiving the solution template from the solution provider, wherein the solution template has been edited.

4. The computer-implemented method of claim 3 further comprising:
    extracting, using computer vision techniques, objects from the data that visually describe the solution steps; and
    generating the editable solution to include the text describing the solution steps and a description of the solution using the objects.

5. The computer-implemented method of claim of claim 1 further comprising:
    receiving a search query for a solution associated with a first computing-based issue;
    searching a solution template database for one or more solution templates associated with the first computing-based issue, wherein the solution template database includes the plurality of solution templates;
    retrieving from the solution template database a set of solution templates associated with the first computing-based issue from the plurality of solution templates; and
    causing a graphical user interface to display the each solution template associated with the first computing-based issue.

6. The computer-implemented method of claim 5 further comprising:
    receiving a first rating for a first solution template of the set of solution templates;
    receiving a second rating for a second solution template of the set of solution templates, wherein the first rating is higher than the second rating; and
    causing the graphical user interface to highlight the first solution template to reflect the higher ranking than the second solution template.

7. The computer-implemented method of claim 1 further comprising:
    generating a Markov chain, wherein a first node and a second node are respectively associated with a first solution component, a second solution component, and a number of instances of each first and second solution component in the plurality of solution templates; and wherein an edge connecting the first node and the second node describes a probability that if a solution template includes the first node, the solution template also includes the second node;

comparing the probability associated with the edge with a threshold probability; and identifying the second solution component associated with the second node as the solution component described in a solution template based on the probability associated with the edge being greater than the threshold probability.

8. A system comprising:

a memory having computer readable instructions; and one or more processors for executing the computer readable instructions, the computer readable instructions controlling the one or more processors to perform operations comprising:

identifying each solution component of a plurality of solution components described in a text of a solution template of a plurality of solution templates, the plurality of solution components being associated with one or more entities, wherein the solution template includes a first combination of solution components;

identifying each solution component of a plurality of solution component described by an object in the solution template of a plurality of solution templates;

detecting a respective number of instances of each solution component in the solution template and a respective number of instances of each solution component in each other solution template of the plurality of solution templates; and generating analytics for a source company based on the respective number of instances of each solution component in the first solution template and the respective number of instances of each solution component in each solution template of the plurality of solution templates, the analytics being utilized to allocate computing resources of the source company to the one or more entities in advance of the computing resources being required by the one or more entities.

9. The system of claim 8, wherein the analytics forecast a second combination of solution components that is different than the first combination of solution components.

10. The system of claim 8, the operations further comprising:

extracting, using natural language processing techniques, text describing solution steps from data;

generating an editable solution template that includes a description of the solution steps in text;

transmitting the editable solution template to a solution provider; and receiving the solution template from the solution provider, wherein the solution template has been edited.

11. The system of claim 10, the operations further comprising:

extracting, using computer vision techniques, objects from the data that visually describe the solution steps; and generating the editable solution to include the text describing the solution steps and a description of the solution using the objects.

12. The system of claim 8, the operations further comprising:

receiving a search query for a solution associated with a first computing-based issue;

searching a solution template database for one or more solution templates associated with the first computing-based issue, wherein the solution template database includes the plurality of solution templates;

retrieving from the solution template database a set of solution templates associated with the first computing-based issue from the plurality of solution templates; and causing a graphical user interface to display the each solution template associated with the first computing-based issue.

13. The system of claim 12, the operations further comprising:

receiving a first rating for a first solution template of the set of solution templates;

receiving a second rating for a second solution template of the set of solution templates, wherein the first rating is higher than the second rating; and causing the graphical user interface to highlight the first solution template to reflect the higher ranking than the second solution template.

14. The system of claim 8, the operations further comprising:

generating a Markov chain, wherein a first node and a second node are respectively associated with a first solution component, a second solution component, and a number of instances of each first and second solution component in the plurality of solution templates; and wherein an edge connecting the first node and the second node describes a probability that if a solution template includes the first node, the solution template also includes the second node;

comparing the probability associated with the edge with a threshold probability; and identifying the second solution component associated with the second node as the solution component described in a solution template based on the probability associated with the edge being greater than the threshold probability.

15. A computer program product comprising a computer readable storage medium having program instructions embodied therewith, the program instructions executable by a processor to cause the processor to perform operations comprising:

identifying each solution component of a plurality of solution components described in a text of a solution template of a plurality of solution templates, the plurality of solution components being associated with one or more entities, wherein the solution template includes a first combination of solution components;

identifying each solution component of a plurality of solution component described by an object in the solution template of a plurality of solution templates;

detecting a respective number of instances of each solution component in the solution template and a respective number of instances of each solution component in each other solution template of the plurality of solution templates; and generating analytics for a source company based on the respective number of instances of each solution component in the solution template and the respective number of instances of each solution component in each other solution template of the plurality of solution templates, the analytics being utilized to allocate computing resources of the source company to the one or more entities in advance of the computing resources being required by the one or more entities.

16. The computer program product of claim 15, wherein the analytics forecast a second combination of solution components that is different than the first combination of solution components.

17. The computer program product of claim 15, the operations further comprising:
- extracting, using natural language processing techniques, text describing solution steps from data;
- generating an editable solution template that includes a description of the solution steps in text;
- transmitting the editable solution template to a solution provider; and
- receiving the solution template from the solution provider, wherein the solution template has been edited.

18. The computer program product of claim 17, the operations further comprising:
- extracting, using computer vision techniques, objects from the data that visually describe the solution steps; and
- generating the editable solution to include the text describing the solution steps and a description of the solution using the objects.

19. The computer program product of claim 15, the operations further comprising:
- receiving a search query for a solution associated with a first computing-based issue;
- searching a solution template database for one or more solution templates associated with the first computing-based issue, wherein the solution template database includes the plurality of solution templates;
- retrieving from the solution template database a set of solution templates associated with the first computing-based issue from the plurality of solution templates; and
- causing a graphical user interface to display the each solution template associated with the first computing-based issue.

20. The computer program product of claim 19, the operations further comprising:
- receiving a first rating for a first solution template of the set of solution templates;
- receiving a second rating for a second solution template of the set of solution templates, wherein the first rating is higher than the second rating; and
- causing the graphical user interface to highlight the first solution template to reflect the higher ranking than the second solution template.

* * * * *